United States Patent [19]

Kikuchi et al.

[11] Patent Number: 4,665,777
[45] Date of Patent: May 19, 1987

[54] CONTROL FOR SHIFTING BETWEEN GEARS OF A VEHICLE AUTOMATIC TRANSMISSION

[75] Inventors: Toshiyuki Kikuchi, Higashi-Hiroshima; Koichi Yamamoto, Hiroshima, both of Japan

[73] Assignee: Mazda Motor Corporation, Hiroshima, Japan

[21] Appl. No.: 772,440

[22] Filed: Sep. 4, 1985

[30] Foreign Application Priority Data

Sep. 8, 1984 [JP] Japan .............................. 59-188668
Sep. 8, 1984 [JP] Japan .............................. 59-188669

[51] Int. Cl.$^4$ .......................................... B60K 41/06
[52] U.S. Cl. .......................................... 74/866; 74/867
[58] Field of Search ................. 74/865, 866, 867, 868, 74/869

[56] References Cited

U.S. PATENT DOCUMENTS

| 3,752,011 | 8/1973 | Casey et al. ................ 74/866 X |
| 4,222,292 | 9/1980 | Will et al. ................... 74/866 |
| 4,224,842 | 9/1980 | Rabus et al. ................. 74/866 |
| 4,308,764 | 1/1982 | Kawamoto et al. ........... 74/752 A |
| 4,346,626 | 8/1982 | Kawamoto ................... 74/869 X |
| 4,351,205 | 9/1982 | Fischer ........................ 74/866 |
| 4,519,273 | 5/1985 | Shimizu et al. .............. 74/866 X |
| 4,539,870 | 9/1985 | Sugano ........................ 74/869 |
| 4,580,466 | 4/1986 | Iwanaga ...................... 74/868 |

Primary Examiner—Leslie Braun
Assistant Examiner—Dwight G. Diehl
Attorney, Agent, or Firm—Fleit, Jacobson, Cohn and Price

[57] ABSTRACT

A vehicle automatic transmission having a torque converter and a multiple-stage gear mechanism. When the vehicle is stopped and the shift lever is moved from the N-range to the D-range, the gear mechanism is at first shifted up to the highest gear stage and, when the converter turbine speed is decreased to a very low value, for example 200 rpm, the gear mechanism is shifted down to the first stage. If the vehicle brake is engaged and the engine is idling, the highest gear stage is maintained even after the converter turbine speed is decreased below the aforementioned value.

7 Claims, 13 Drawing Figures

CONTROL FOR SHIFTING BETWEEN GEARS OF A VEHICLE AUTOMATIC TRANSMISSION

BACKGROUND OF THE INVENTION

1. Field of the Invention

The present invention relates to a vehicle automatic transmission, and more particularly to a vehicle automatic transmission having a hydraulic torque converter and a multiple-stage transmission gear mechanism connected with the torque converter. More specifically, the present invention pertains to a control of a vehicle automatic transmission of the aforementioned type.

2. Description of Prior Art

In a vehicle having an automatic transmission comprised of a torque converter and a multiple-stage transmission gear mechanism, a shift lever is provided for selecting one of N-range (neutral), D-range, 2-range, 1-range, R-range (reverse) and P-position (parking). It has been experienced in this type of vehicle that a shifting shock is produced when the shift lever is moved from the N-range to a running range such as the D-range, 2-range and 1-range. This type of shifting shock is sometimes referred to as the "N-D shock" and caused by the fact that a power transmitting gear train is established in the transmission gear mechanism through engagements of appropriate friction members when the shift lever is actuated to make it possible to transmit the engine output power through the gear mechanism to the wheels of the vehicle. It should be noted that in this instance the transmission gear mechanism assumes a first gear stage wherein the engine output torque is multiplied with a largest ratio so that the driving wheels are suddenly subjected to a large driving torque. It should further be noted that in the first gear stage the hydraulic pressure for engaging the friction members is higher than in other gear stages because the friction members are subjected to higher reaction forces than in other gear stages. Thus, the engagements of the friction members with such high pressure can produce a noticeable shift shock.

In order to solve the problem, the U.S. Pat. No. 4,222,292 proposes to make a higher gear stage at first engage when the shift lever is actuated from the N-range to one of the running ranges and then make the first gear stage engage. Due to the fact that the driving torque in the higher gear stage is smaller than in the first gear stage and the hydraulic pressure for making engagement of the friction members for the higher gear stage is smaller than that for the first gear stage, the shift shock can be moderated. It will also be understood that the shift shock is not so significant when the transmission gear mechanism is shifted from a higher gear stage to the first gear stage as compared with a shifting from the neutral to the first gear stage.

It should be noted however that the time for maintaining the gear machanism in the higher stage is important and should be strictly determined because, if the time is too short, the gear mechanism is shifted to the first stage before the higher stage is completely established possibly resulting in a loss of shock reduction effect. If the time is too long, the gear mechanism may not be in the first stage when the driver intends to start the vehicle. It is therefore desirable that the time be strictly determined so that the higher gear stage is completed without fail but the gear mechanism is immediately shifted down to the first stage after the higher stage is completed.

According to the proposal by the aforementioned U.S. patent, it is suggested to provide a fixed time for bringing the gear mechanism into the higher gear stage. It will be necessary to determine the fixed time to a value substantially equal to the time wherein the engagements of the friction members for the higher gear stage can just be completed, however, this is very difficult in actual practice because the time required for the engagements of the friction members is not always constant but changes depending on possible manufacturing tolerances of parts or on possible dimensional changes after manufacture. Further, the time may also change depending on the viscosity of working fluid which may change depending on the temperature. The time is also a function of the pressure of the working fluid which changes in accordance with the engine output. Thus, the control as proposed by the U.S. patent cannot provide a satisfactory result.

A further problem encountered in a vehicle having an automatic transmission is that, when the vehicle is stopped with the shift lever is positioned in one of the running ranges so that the transmission gear mechanism is in the first stage, the engine idling vibrations are transmitted through the transmission to the vehicle body. It is possible to solve the problem by shifting the gear mechanism to a higher gear stage, however, if the higher stage is maintained until the time when the vehicle is to be started, it becomes difficult to start the vehicle smoothly. If the gear mechanism is shifted down to the first stage sufficiently earlier than the time for the vehicle start, there will remain the problem of the idling vibrations.

SUMMARY OF THE INVENTION

It is therefore an object of the present invention to provide vehicle automatic transmission control means wherein the transmission gear mechanism is at first shifted to a higher gear stage and then to the first stage when the shift lever is actuated from the N-position to a running range.

Another object of the present invention is to provide vehicle automatic transmission control means of the aforementioned type wherein the time for shifting the gear mechanism to the higher gear stage is determined in accordance with the progress of the shifting operation.

A further object of the present invention is to provide vehicle automatic transmission control means wherein the time for shifting the transmission gear mechanism down to the first gear stage after an actuation of the shift lever from neutral to a running stage can be determined most appropriately irrespective of the possibility of change in time for finishing the shifting up operation from neutral to a higher gear stage.

Still further object of the present invention is to provide vehicle automatic transmission control means wherein the transmission gear mechanism is shifted to a higher gear stage without fail before it is shifted down to the first gear stage when the shift lever is actuated from the neutral position to a running range.

Still further object of the present invention is to provide vehicle automatic transmission control means by which the shift shock can effectively be suppressed but nevertheless the vehicle can be started smoothly at the first gear stage.

Yet another object of the present invention is to provide vehicle automatic transmission control means in which the idle vibration can be effectively prevented.

According to the present invention, the above and other objects can be accomplished, in a vehicle having an engine provided with engine output control means having an idle position, an automatic transmission comprised of a torque converter, a multiple stage transmission gear mechanism connected with the torque converter and having a neutral gear stage, a first gear stage and at least one higher gear stage, gear stage selecting means for selecting one of the gear stages, and a shift lever having a neutral range and at least one running range for operating the gear stage selecting means so that the neutral gear stage is selected when the shift lever is in the neutral range and one of the first and higher gear stages is selected when the shift lever is in the running range. For the purpose, there are provided shift operation detecting means for detecting that the shift lever is actuated from the neutral range to the running range, converter turbine speed detecting means for detecting rotating speed of the turbine in the torque converter, engine idle detecting means for detecting that the engine output control means is in the idle position, brake detecting means for detecting that the vehicle brake means is engaged. Control means is further provided to receive signals from the aforementioned detecting means and operate the gear stage selecting means when it is detected that the shift lever is actuated from the neutral range to the running range. The control means functions to operate the gear stage selecting means when the shift lever is actuated from the neutral range to the running range so that the gear mechanism is at first shifted from the neutral gear stage to the higher gear stage and, if the brake means is not engaged, it is shifted down to the first gear stage when the torque converter turbine speed has decreased to a predetermined value. It should be noted that the torque converter turbine is rotating at a speed substantially equal to the engine speed when the gear mechanism is in the neutral gear stage but the speed is gradually decreased as the shifting to the higher gear stage progresses. When the shifting operation to the higher gear stage is completed, the turbine speed is decreased to a certain value, for example, 200 rpm. It is therefore possible, by detecting the torque converter turbine speed and delaying the shifting down operation to the first gear stage until the turbine speed is decreased to the predetermined value, to ensure that the gear mechanism be brought into the higher gear stage without fail before it is shifted down to the first gear stage.

When it is detected that the brake means is engaged while the engine is idling, it is judged that the driver is willing to maintain the vehicle stationary, the control means operates the gear stage selecting means so that the higher gear stage is maintained. With this control it is possible to suppress transmittal of the engine idling vibrations to the vehicle body. As soon as the brake means is released, the gear mechanism is shifted down to the first gear stage for a smooth vehicle start.

Thus, according to the present invention, there is provided a vehicle having vehicle brake means, an engine provided with engine output control means having an idle position, an automatic transmission comprising a torque converter having a turbine, a multiple-stage transmission gear mechanism connected with the turbine of the torque converter and having a neutral gear stage, a first gear stage and at least one higher gear stage, gear stage selecting means for selecting one of the gear stages, and a shift lever having a neutral range and at least one running range for operating the gear stage selecting means so that the neutral gear stage is selected when the shift lever is in the neutral range and one of the first and higher gear stages is selected when the shift lever is in the running range, the improvement comprising shift operation detecting means for detecting that the shift lever is actuated from the neutral range to the running range, turbine speed detecting means for detecting a rotating speed of the turbine in said torque converter, control means responsive to output signals from said detecting means to operate the gear stage selecting means when the shift lever is actuated from the neutral range to the running range so that the gear mechanism is shifted from the neutral gear stage up to the higher gear stage until the speed of the turbine in the torque converter is decreased to a predetermined value. In one aspect of the present invention, the control means includes shift signal producing means for producing a shift signal in accordance with a vehicle speed signal and an engine load signal, said control means further including means for passing the shift signal to the gear stage selecting means when the speed of the turbine is decreased to the predetermined value. The vehicle further has engine idle detecting means for detecting that the engine output control means is in the idle position and brake detecting means for detecting that vehicle brake means is engaged, the control means being responsive to output signals from the idle detecting means and the brake detecting means for operating the gear stage selecting means so that the gear mechanism is maintained in the higher gear stage even after the speed of the turbine has decreased to the predetermined value when the engine output control means is in the idle position and the vehicle brake means is engaged.

The above and other objects and features of the present invention will become apparent from the following descriptions of a preferred embodiment taking reference to the accompanying drawings.

DESCRIPTION OF THE PREFERRED EMBODIMENT

Basic Structure of the Transmission

Figure 2:
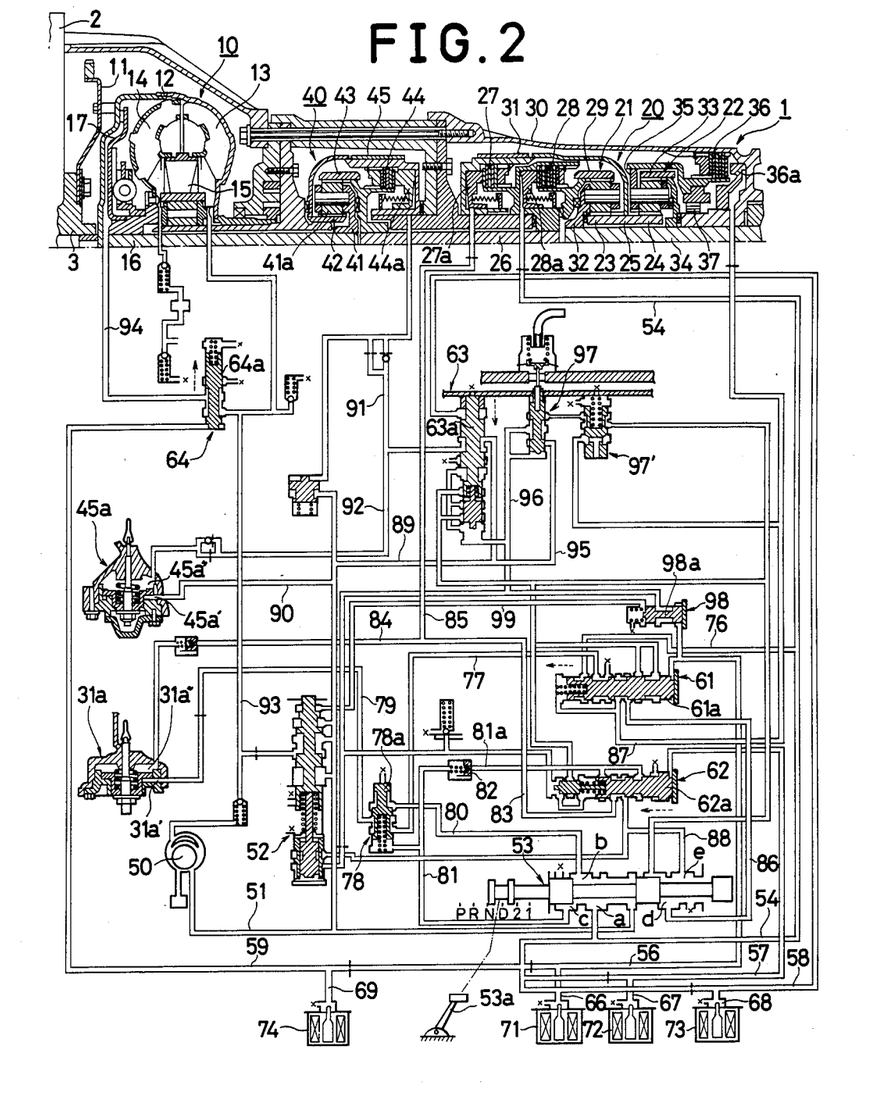
FIG. 2 is a sectional view showing an automatic transmission and its hydraulic control circuit in accordance with one embodiment of the present invention.

Referring now to FIG. 2, there is shown an automatic transmission 1 which comprises a hydraulic torque converter 10, a multiple stage transmission gear mechanism 20, and a planetary gear type over-drive transmission mechanism 40 arranged between the torque converter 10 and the multiple stage transmission gear mechanism 20.

The torque converter 10 has a pump 13 connected with an output shaft 3 of an engine 2 through a drive plate 11 and a converter casing 12, a turbine 14 provided in the casing 12 to face to the pump 13 and a stator 15 disposed between the pump 13 and the turbine 14. A converter output shaft 16 is connected with the turbine 14. A lock-up clutch 17 is provided between the converter output shaft 16 and the casing 12 which is connected to the pump 13. The lock-up clutch 17 is normally engaged with the casing 12 under a pressure of hydraulic fluid which circulates in the torque converter 10, and is released by a hydraulic pressure, which is drawn to a space between the casing 12 and the clutch 17 from an external pressure source.

The multiple stage transmission gear mechanism 20 has a front planetary gear unit 21 and a rear planetary gear unit 22. The front planetary gear unit 21 has a sun gear 23 connected with a sun gear 24 of the rear planetary gear unit 22 though a connecting rod 25. The gear mecahnism 20 has an input shaft 26 connected through a front clutch 27 with the connecting rod 25 and through a rear clutch 28 with an internal gear 29 of the front planetary gear unit 21. A front brake 31 is provided between the connecting rod 25 or the sun gears 23, 24 of the gear units 21 and 22 and a casing 30 of the transmission. The gear mechanism 20 also has an output shaft 34 connected with a planetary carrrier 32 of the front planetary gear unit 21 and an internal gear 33 of the rear planetary gear unit 22. The rear planetary gear unit 22 has a planetary carrier 35, and there are provided between the planetary carrier 35 and the transmission casing 30 a rear brake 36 and a one-way clutch 37.

The planetary gear type over-drive transmission mechanism 40 includes planetary gears 41a, a planetary carrier 41 rotatably carrying the planetary gears 41a and connected with the output shaft 16 of the torque converter 10, a sun gear 42 engaged with the planetary gears 41a, and an internal gear 43 which is also engaged with the planetary gears 41a and connected with the sun gear 42 through a direct connecting clutch 44. An over-drive brake 45 is provided between the sun gear 42 and the transmission casing 30. The internal gear 43 is connected with the input shaft 26 of the multiple stage transmission gear mechanism 20.

The multiple stage transmission gear mechanism 20 is of known type and can provide three forward driving gear stages and one reverse stage through selective engagements of the clutches and brakes. The relationships between the forward gear stages and the engagements of the clutches and brakes are shown in Table 1 together with typical values of gear ratios in the gear stages. The planetary gear type over-drive transmission mechanism 40 connects the shafts 16 and 26 directly when the direct connection clutch 44 is engaged and the brake 45 is released, and provides an over-drive connection between the shafts 16 and 26 when the brake 45 is engaged and the clutch 44 is released. This function is shown in Table 2 together with typical values of the gear ratios.

TABLE 1

| GEAR STAGE | FRONT CLUTCH 27 | REAR CLUTCH 28 | FRONT BRAKE 31 | REAR BRAKE 36 | GEAR RATIO |
|---|---|---|---|---|---|
| 1 |  | o |  | o | 2.841 |
| 2 |  | o | o |  | 1.541 |
| 3 | o | o |  |  | 1.000 |

TABLE 2

| GEAR STAGE | DIRECT CONNECT CLUTCH 44 | OVER-DRIVE BRAKE 45 | GEAR RATIO |
|---|---|---|---|
| DIRECT | o |  | 1.000 |
| OVER-DRIVE |  | o | 0.720 |

It will be understood that, by combining the three forward gear stages in the gear mechanism 20 and the two gear stages in the over-drive transmission gear mechanism 40, it becomes possible to obtain six gear stages of different overall gear ratios.

Hydraulic Control Circuit

The above-mentioned automatic transmission is provided with a hydraulic control circuit as shown in FIG. 2. The hydraulic control circuit has an oil pump 50 which is driven by the engine output shaft 3. Hydraulic oil is discharged under pressure from the pump 50 into a pressure line 51. The oil pressure is reduced by a pressure regulating valve 52 and applied to a select valve 53. The select valve 53 has a plunger which can be selectively positioned by means of a shift lever 53a in one of the shift positions 1, 2, D, N, R and P. When the plunger is positioned in one of the shift positions 1, 2 and D, the pressure line 51 is communicated with ports a, b, c of the select valve 53. The port a is communicated with a hydraulic actuator 28a for the rear clutch 28 through a line 54. When the select valve 53 is positioned in the above mentioned position, the actuator 28a makes the rear clutch 28 engage. The port a is also communicated with the left-hand end portion of a 1-2 shift valve 61 having a spool 61a which is now biased rightward in FIG. 2 under the oil pressure from the port a. The port a is further communicated with the right-hand end portion of the 1-2 shift valve 61 through a first line 56, the right-hand end portion of a 2-3 shift valve 62 through a second line 57, and the upper end portion of 3-4 shift valve 63 through a third line 58. First, second and third drain lines 66, 67 and 68 are provided in the first, second and third lines 56, 57 and 58, respectively. These drain lines 66, 67 and 68 are respectively provided with a first, second and third solenoid valves 71, 72 and 73 for opening and closing them. When the port a is communicated with the line 51 and the solenoid valves 71, 72 and 73 are energized to close the drain lines 66, 67, 68, the pressure is built up in the first, second and third line 56, 57, 58.

The port b is communicated with a second lock valve 78 through a line 80. The oil pressure which is applied from the port b to the second lock valve 78 acts to bias the spool 78a of the valve 78 downwards. When the spool 78a of the valve 78 is in the lower position, the line 80 is communicated with the line 79 so that the oil pressure is introduced into a brake engaging pressure chamber 31a' of an actuator 31a to engage the front brake 31. The port c is communicated with the second lock valve 78 through a line 81. The oil pressure which is applied from the port c to the second lock valve 78 acts to bias the spool 78a of the valve 78 upward. The port c is also communicated with the 2-3 shift valve 62 through a pressure line 81a having an orifice check valve 82. The line 81a is communicated with a line 83 when the spool 62a of the 2-3 shift valve 62 is moved leftward by the pressure in the second line 57 which increases upon energizing the solenoid valve 72 in the drain line 67. The line 83 is communicated with the releasing pressure chamber 31a" of the actuator 31a. When oil pressure is introduced into the releasing pressure chamber 31a", the actuator 31a is moved to release the brake 31 against the pressure in the engaging pressure chamber 31a'. Besides, the pressure in the line 83 is introduced into the actuator 27a for the front clutch 27 to make the clutch 27 engage.

The select valve 53 has a port d which is communicated with the pressure line 51 when the valve 53 is positioned in the position 1. The port d is communicated with the 1-2 shift valve 61 through a line 86, and with an actuator 36a for the rear brake 36 further through a line 87. When the solenoid valves 71 and 72 are energized, the spools of the 1-2 shift valve 61 and the 2-3 shift valve 62 are moved to thereby change the port connections for engaging appropriate brakes and/or clutches to establish 1-2, 2-3 shifting operations respectively. The hydraulic control circuit is also provided with a cut-back valve 98 for making the oil pressure from the pressure regulating valve 52 stable, a vaccum throttle valve 97 for varying the line pressure supplied from the pressure regulating valve 52 through a line 95 according to the suction pressure in the engine intake passage, and a valve 97' for backing up the throttle valve 97. The throttle pressure from the vacuum throttle valve 97 is supplied to a line 96.

Furthermore, this hydraulic control circuit is provided with an actuator 44a for controlling the clutch 44 and an actuator 45a for the brake 45 of the planetary gear type over-drive transmission mechanism 40. The actuator 45a has an engaging pressure chamber 45a' communicated with the pressure line 51 through a line 90. The brake 45 is operated when the actuator 45a is moved under the pressure in the line 51. The pressure line 51 is connected through a line 89 with the 3-4 shift valve 63. When the solenoid valve 73 is energized, the spool 63a of the 3-4 shift valve 63 is moved downward to communicate the pressure line 51 through the line 89 with a line 91 so that the oil pressure is introduced into the line 91. The oil pressure introduced into the line 91 acts through a line 92 on a releasing pressure chamber 45a" of the actuators 45a to release the brake 45, and on the actuator 44a to make the clutch 44 engage.

Still furthermore, the present hydraulic control circuit is provided with a lock-up control valve 64, which is communicated with a port a of the select valve 53 through a line 59. From the line 59, divided is a drain line 69 which is provided with a selenoid valve 74. When the pressure in the line 59 increases by closing the drain line 69 with the solenoid valve 74 being energized, the lock-up control valve 64 has its spool 64a moved upward to cut the communication between lines 93 and 94 and drain the pressure in the line 94 so that the lock-up clutch 17 is engaged.

In the above arrangement, the relations of the overall gear ratios and the operations of the solenoids, the brakes and the clutches are shown in Table 3.

TABLE 3

| SOLENOID 71 | SOLENOID 72 | SOLENOID 73 | FRONT CLUTCH 27 | REAR CLUTCH 28 | FRONT BRAKE 31 | DIRECT CONNECT CLUTCH 44 | OVER-DRIVE BRAKE 45 | GEAR RATIO |
|---|---|---|---|---|---|---|---|---|
| OFF | OFF | OFF |   | o |   | o |   | 2.841 |
| ON | OFF | OFF |   | o | o | o |   | 1.541 |
| OFF | ON | OFF | o | o |   | o |   | 1.000 |
| OFF | OFF | ON |   | o |   |   | o | 2.046 |
| ON | ON | OFF | o | o |   | o |   | 1.000 |
| ON | OFF | ON |   | o | o |   | o | 1.110 |
| OFF | ON | ON | o | o |   |   | o | 0.720 |
| ON | ON | ON | o | o |   |   | o | 0.720 |

It will be understood in the Table 3 that six different gear ratios can be obtained through selective energization of the three solenoids 71, 72 and 73. Thus, it is possible to selectively combine the gear ratios to provide a plurality of operating modes as, for example, shown in Table 4.

TABLE 4

| GEAR STAGE | POWER MODE | NORMAL MODE | ECONOMY MODE A | ECONOMY MODE B |
|---|---|---|---|---|
| 1 | 2.841 | 2.841 | 2.046 | 2.046 |
| 2 | 2.046 | 1.541 | 1.541 | 1.541 |
| 3 | 1.541 | 1.000 | 1.000 | 1.110 |
| 4 | 1.000 | 0.720 | 0.720 | 1.000 |
| 5 | 0.720 |   |   | 0.720 |

In Table 5, there is a relationship between the operation of the solenoid 74 and the torque converter lock-up.

TABLE 5

| SOL 74 | Lock-up |
|---|---|
| ON | engage |
| OFF | release |

General Arranqements

Figure 1:
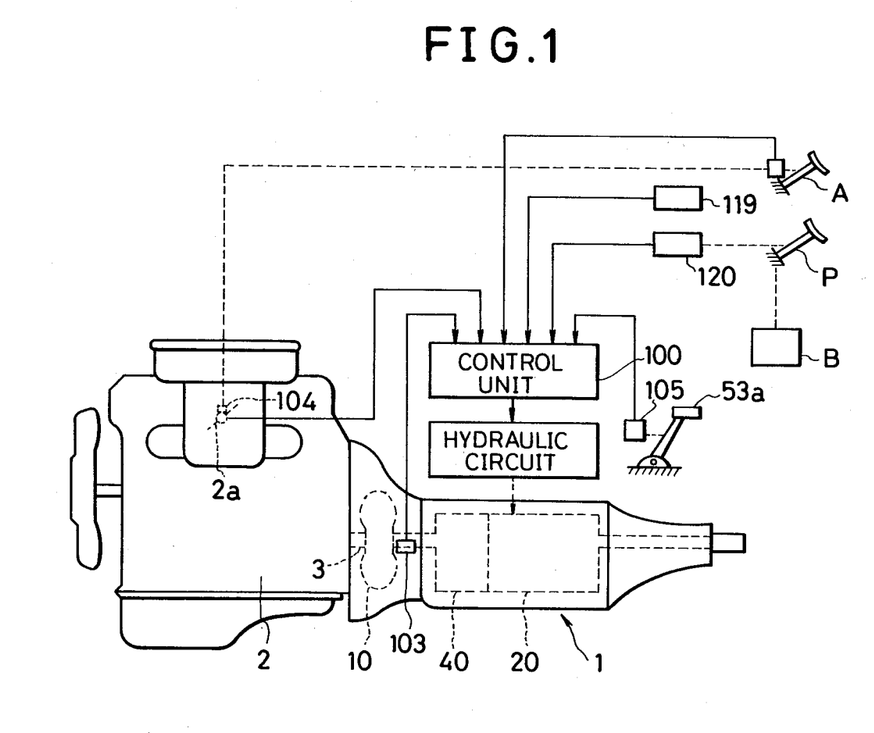
FIG. 1 is a diagrammatical illustration of a vehicle traction system to which the present invention is embodiment.

Referring to FIG. 1, it will be noted that an electronic control unit 100 for controlling the above hydraulic circuit. The vehicle is provided with a vehicle brake device B which is actuated by a brake pedal P. For detecting that the brake is engaged, there is provided a brake pedal switch 120 which closes when the brake pedal P is depressed. The engine 2 has a throttle valve 2a which is provided with a throttle position sensor 104. The throttle valve 2a is actuated by a foot pedal A which is provided with an engine idle switch 119 adapted to be closed when the pedal A is released. The turbine 13 of the torque converter 10 is provided with a turbine speed sensors 103 and the shift lever 53a is provided with a shift position sensor 105. The signals from the sensors and switches are applied to the control unit 100 which then controls the hydraulic circuit in accordance with the signals.

Control Unit

Figure 3:
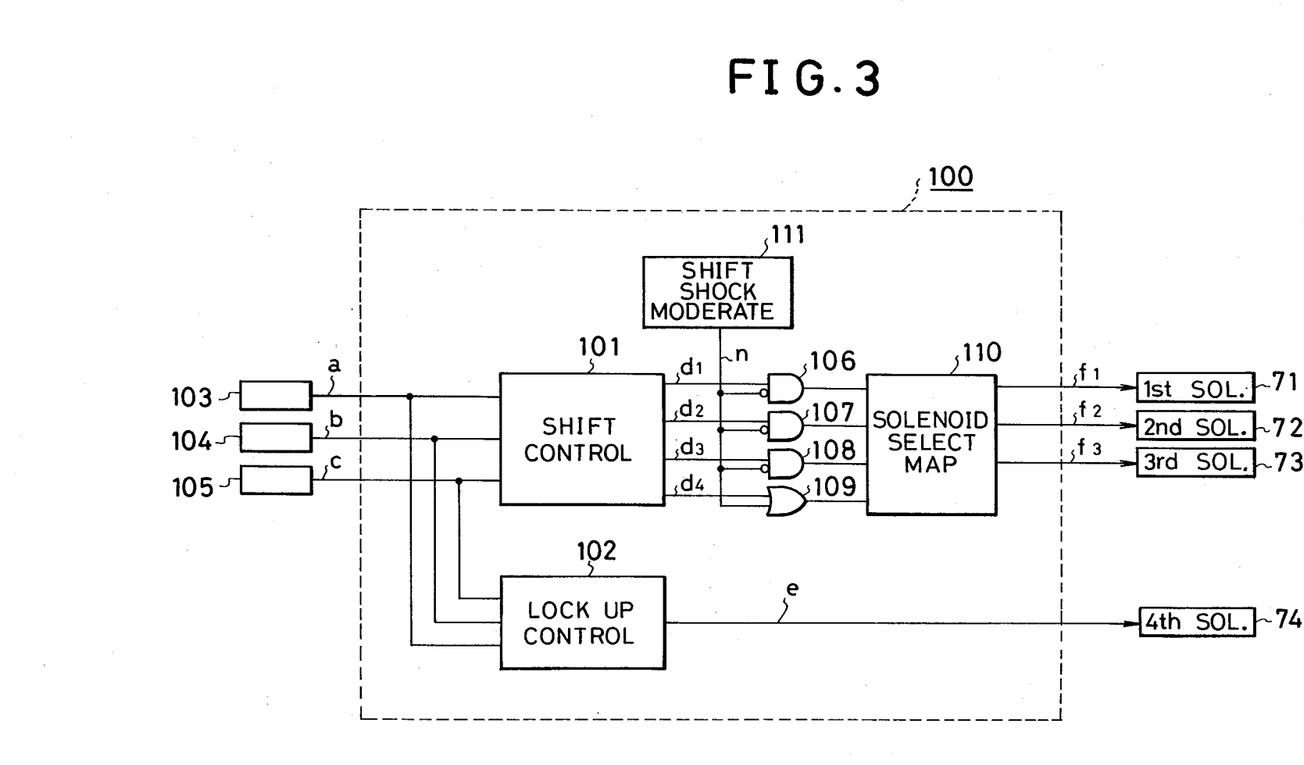
FIG. 3 is a block diagram showing the control unit in accordance with one embodiment of the present invention.
Figure 4:
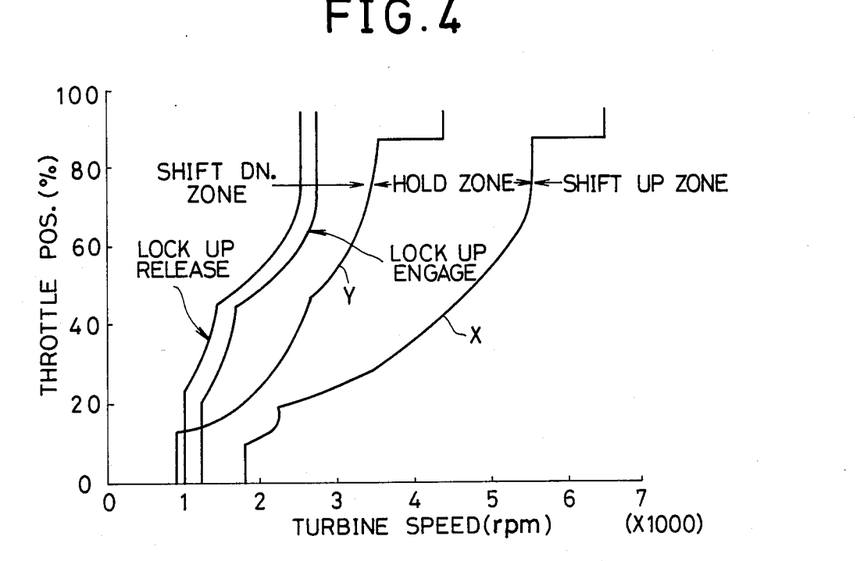
FIG. 4 is a diagram showing an example of the gear shifting map.

Referring now to FIG. 3, it will be noted that the control unit 100 includes a shift control circuit 101 and a lock-up control circuit 102 which are connected with the turbine speed sensor 103, the throttle position sensor 104 and the shift position sensor 105 to receive a turbine speed signal a, a throttle position signal b and a shift position signal c. The circuits 101 functions to judge, based on the input signals a, b and c, as to whether the engine operating condition is in the shift-up zone, the shift-down zone or in the hold zone referring to the control map shown in FIG. 4. Similarly, the circuit 102 functions to judge whether the operating condition is in the lock-up zone or not. The circuit 101 produces shift signals $d_1$ through $d_4$ which respectively corresponds to the first through fourth gear stages. The circuit 102 produces a lock-up signal e. The outputs for the signals $d_1$ through $d_3$ are applied respectively to one inputs of AND circuits 106, 107 and 108 and the output for the signal $d_4$ is applied to one input of an OR circuit 109. The outputs of the circuits 106 through 109 are applied to a solenoid selecting map 110 which has outputs $f_1$, $f_2$ and $f_3$ for energizing the solenoids 71, 72 and 73. The lock-up signal e from the circuit 102 is applied to the solenoid 74 to control the lock-up clutch 17.

It will be noted in FIG. 3 that the control unit 100 further includes a shift shock moderating circuit 111. As shown in detail in FIG. 5, the circuit 111 is connected with an N-range switch 112 which is closed when the shift lever 53a is in the N-range to produce an N-range signal g, a D-range switch 113 which is closed when the shift lever 53a is in the D-range to produce a D-range signal h and the aforementioned turbine speed sensor 103. The N-range signal g and the D-range signal h are applied to a flip-flop 114 at the D and T terminals, respectively. The turbine speed signal a is applied to an F-V converter 115 in which the signal a is converted into a voltage signal. The output signal from the F-V converter 115 is applied to a negative terminal of a comparator 116 to be compared with a reference signal. The comparator 116 produces a high output a' when the turbine speed is below a predetermined value, for example, 200 rpm. The signal a' from the comparator 116 is inverted by a NOT circuit 117 and applied to a reset terminal of the flip-flop 114 as a reset signal a". The flip-flop 114 functions to pass to the output terminal Q the N-range signal g which has been applied to the D input terminal when the D-range signal g has been turned to "1", from the time when the D-range signal h is turned from "0" to "1" to the time when the reset signal a" is turned from "1" to "0". The output of the flip-flop 114 is designated by the reference i.

Figure 6:
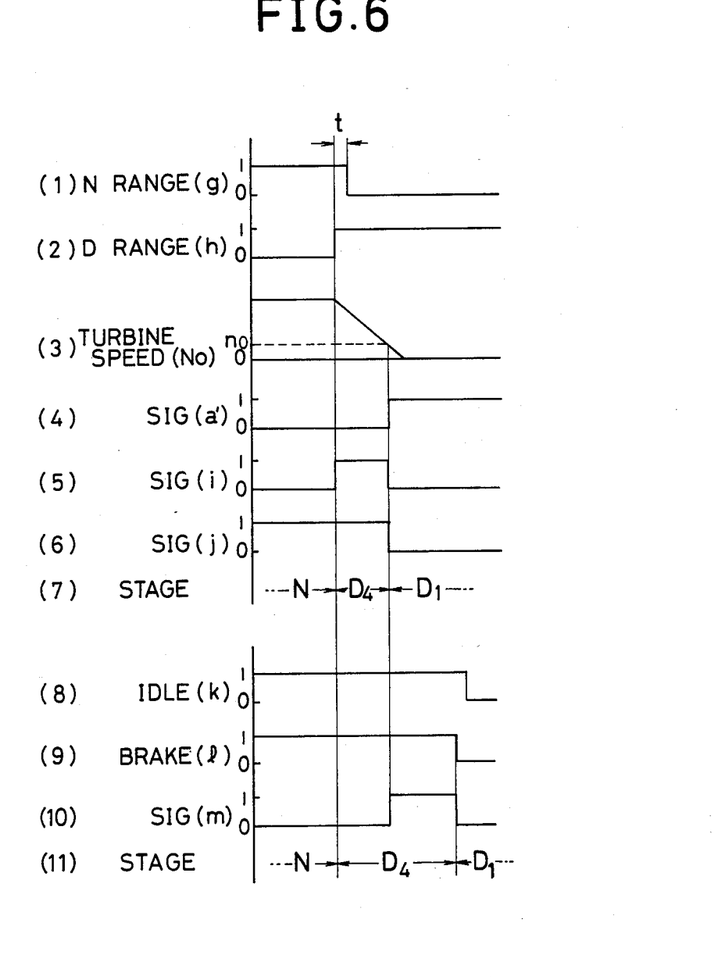
FIG. 6 is a diagram showing operations of the embodiment.

When the shift lever 53a is actuated from the N-range to the D-range, the N-range signal g turns to "0" with a certain time delay t after the D-range signal h is turned to "1" as shown in FIG. 6 (1) and (2). Therefore, the output signal i from the flip-flop 114 is maintained to "1" after the D-range signal is turned to "1" until the turbine speed is decreased to the predetermined value No to turn the reset signal a" to "0" as shown in FIGS. 6 (3) to (5).

Figure 5:
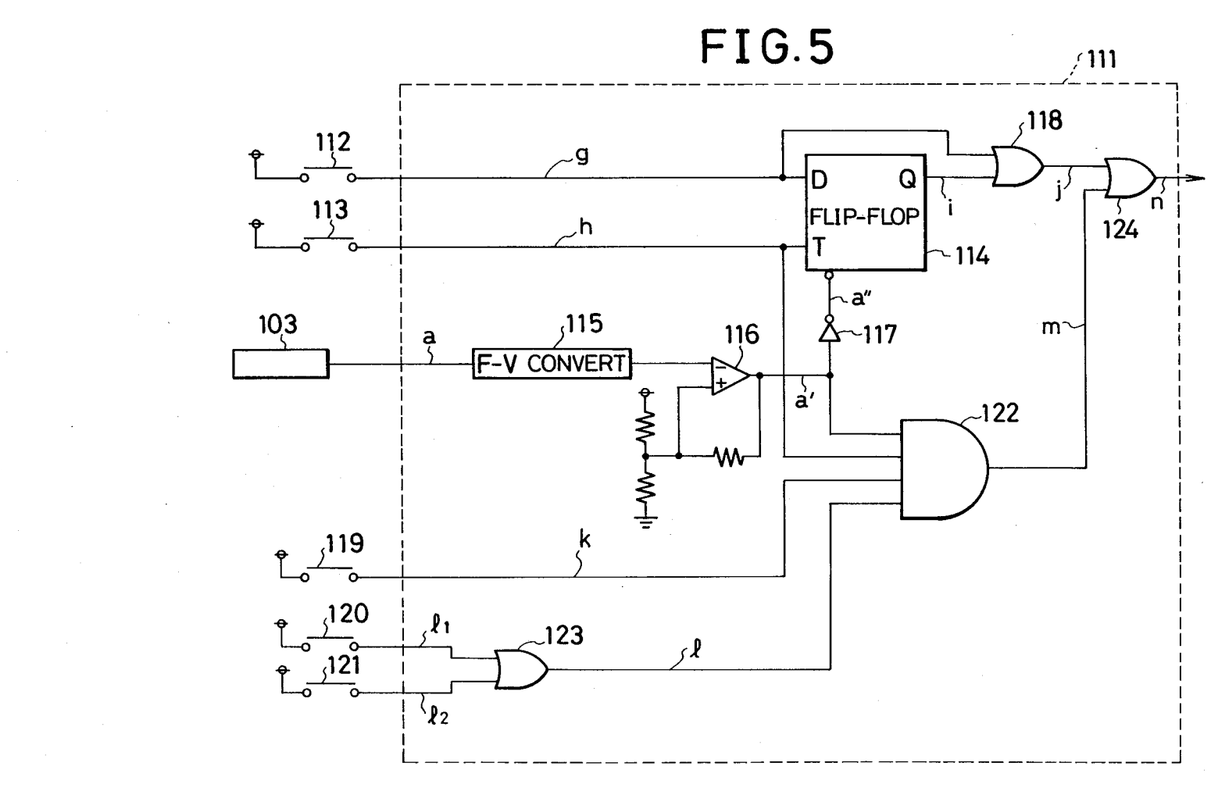
FIG. 5 is a block diagram showing the details of the N-D shock moderating circuit.

The output signal i of the flip-flop 114 is applied to an OR circuit 118. The OR circuit 118 is also applied with the N-range signal g so that the OR circuit 118 produces a 1-4 stage signal j which is maintained at "1" from the time when the shift lever 53a is moved to the N-range to the time when the shift lever 53a is moved to the D-range and the turbine speed is decreased to the predetermined value No. It should be noted herein that the comparator 116 has hysteresis for preventing huntings so that the signal a' is turned to "1" when the turbine speed is decreased to a first value No, for example, 200 rpm and turned to "0" when the turbine speed is increased to a second value No', for example, 280 rpm which is larger than the first value.

The circuit 111 further receives an idle signal k from the idle switch 119, a first brake signal $l_1$ from the brake switch 120 and a second brake signal $l_2$ from a hand brake switch 121 which is closed when a hand brake (not shown) is engaged. There is an AND circuit 122 which has inputs for receiving the signal a' from the comparator 116, the D-range signal h from the D-range switch 113, and the idle signal k from the idle switch 119. The brake signals $l_1$ and $l_2$ are applied to an OR circuit 123 to produce a brake signal 1 which is also applied to the AND circuit 122. It will therefore be understood that, as shown in FIGS. 6 (2), (4), (8), (9) and (10), when the signals h, a', k and 1 are all at "1", the AND circuit 122 produces a 2-4 stage signal m. The signal m is at "1" level when the shift lever 53a is in the D-range but the speed is below the predetermined value No designating that the vehicle is not moving and the engine is idling with one of the foot brake and the hand brake being engaged. The 1-4 stage signal j and the 2-4 stage signal m are applied to an OR circuit 124 which produces an output signal n. The output signal n is the 4 stage signal which becomes the level "1" when at least one of the signals j and m is at "1".

As shown in FIG. 3, the 4 stage signal n is inverted and applied to the AND circuits 106, 107 and 108. Further, the signal n is applied to the OR circuit 109 without being inverted. It will therefore be understood that, when the 4 stage signal n is at "0" level, the signals $d_1$ through $d_4$ are applied to the solenoid selecting map 110 so that the solenoids 71, 72 and 73 are energized in accordance with the function of the circuit 101. When the signal n is at the level "1", the signal n is passed through the OR circuit 109 to function as the signal $d_4$ so that the solenoid 71, 72 and 73 are in conditions wherein the fourth stage is selected.

It will be noted that the 1-4 stage signal j and the 4 stage signal n are at the level "1" before the shift lever 53a is moved from the N-range to the D-range so that the solenoids 71, 72 and 73 are in the conditions for obtaining the fourth gear stage. However, at this instance, the shift valves 61, 62 and 63 are not applied with hydraulic pressure so that the gear mechanism is not shifted to the fourth stage. It is advisable to have the 1-4 stage signal j at the level "1" to place the solenoids 71, 72 and 73 in conditions wherein the fourth stage can be obtained because, by doing so, it becomes possible to carry out the shifting up operation to the fourth stage quickly when the shift lever 53a is moved to the D-range.

It will be understood from the above description that, when the foot brake and the hand brake are not engaged, the transmission gear mechanism is shifted at first to the fourth stage by the 1-4 stage signal j and then shifted down to the first stage in accordance with the signal from the circuit 101 as soon as the signal j turns to "0" as shown in FIG. 6 (7) because the 2-4 stage signal m is at the level "0", at this instance. Thus, the driving effort applied from the engine to the driving wheels is stepwisely increased when the shift lever is moved to the D-range. It is therefore possible to moderate the shift shock. The time wherein the signal j is maintained at the level "1" is determined by the time in which the turbine speed decreases to the value No. The decrease in the turbine speed is considered as representing the progresses of engagements of the appropriate friction members, so that the fact that the turbine speed has decreased shows that shifting up to the fourth stage has been substantially completed.

The time spent for the engagements of the friction members may be different depending on the hydraulic pressure which may be affected by the engine output. Further, in a cold engine, the viscosity of the working fluid is relatively high so that engagements of the friction members may be delayed. According to the control described above, the shifting up to the fourth stage can be accomplished without fail irrespective of the variations in the shifting time. Further, the shifting down to the first stage is carried out as soon as the shifting up to the fourth stage is completed.

When the foot brake or the hand brake is engaged, the shift-up to the fourth stage is carried out in the same manner as described above. The turbine speed will than decrease to a value below No to turn the signal j to "0". At this instance, however, the 2-4 stage signal m is at the level "1" so that the transmission gear mechanism is maintained at the fourth stage as shown in FIG. 6 (11). It is therefore possible to prevent the idle vibrations. As soon as the brake is released, the signal m turns to "0" so that the shifting down to the first stage is immediately made.

In the embodiment being described, the control unit 100 can be provided by a microprocessor with an appropriate program. The operation will now be described with reference to FIGS. 7 through 13.

General Operation

Figure 7:
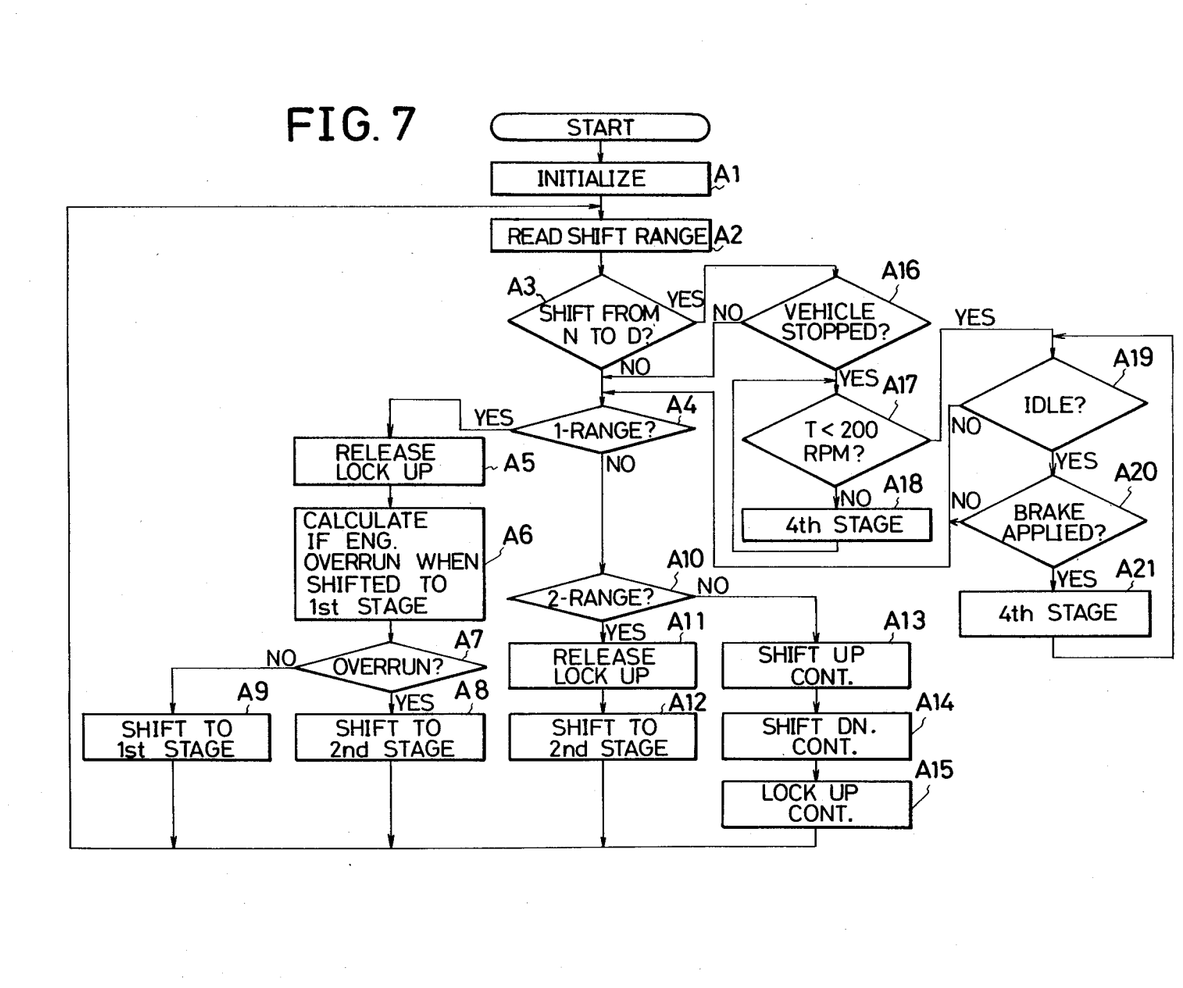
FIG. 7 is a program flow chart showing a general operation of the control unit.

FIG. 7 shows in general the operation of the control unit. When the program is initialized at the step $A_1$, the ports in the respective hydraulic control valves and the circuit are brought into initialized positions to thereby hold the gear mechanism at the first stage and release the torque converter lock-up clutch 17. Thereafter, the shift range or the position of the select valve 53 is read at the step $A_2$ and a judgement is carried out in the step $A_3$ as to whether the shift range is changed from the N-range to the D-range. If the answer is NO, a further judgement is made in the step $A_4$ as to whether the shift range is at the "1" range. If the judgement is YES, a signal is produced in the step $A_5$ to deenergize the solenoid 74 so as to release the lock-up clutch 17. Then, a calculation is made in the step $A_6$ to know whether the engine will overrun if the gear mechanism is then shifted down to the first stage. A judgement is then made in the step $A_7$ as to whether the engine will overrun based on the result of the calculation in the step $A_6$. If the judgement is YES, a signal is produced to shift the gear mechanism to the second stage in the step $A_8$. If the judgement in the step $A_7$ is NO, a signal is produced to shift the gear mechanism to the first stage in the step $A_9$. If the judgement in the step $A_4$ is NO, a further judgement is carried out in the step $A_{10}$ as to whether the shift range is at "2" range. If the judgement is YES, a signal is applied in the step $A_{11}$ to energize the solenoid valve 74 to release the lock-up clutch 17 and a further signal is applied in the step $A_{12}$ to fix the gear mechanism at the second stage. If the judgement is to indicate that the shift range is not at the second stage, it is interpreted that the shift valve 53 is in the "D" range. Then, the shift-up control, the shift-down control and the lock-up control are carried out respectively in the steps $A_{13}$, $A_{14}$ and $A_{15}$.

Shift-up Control

Figure 8:
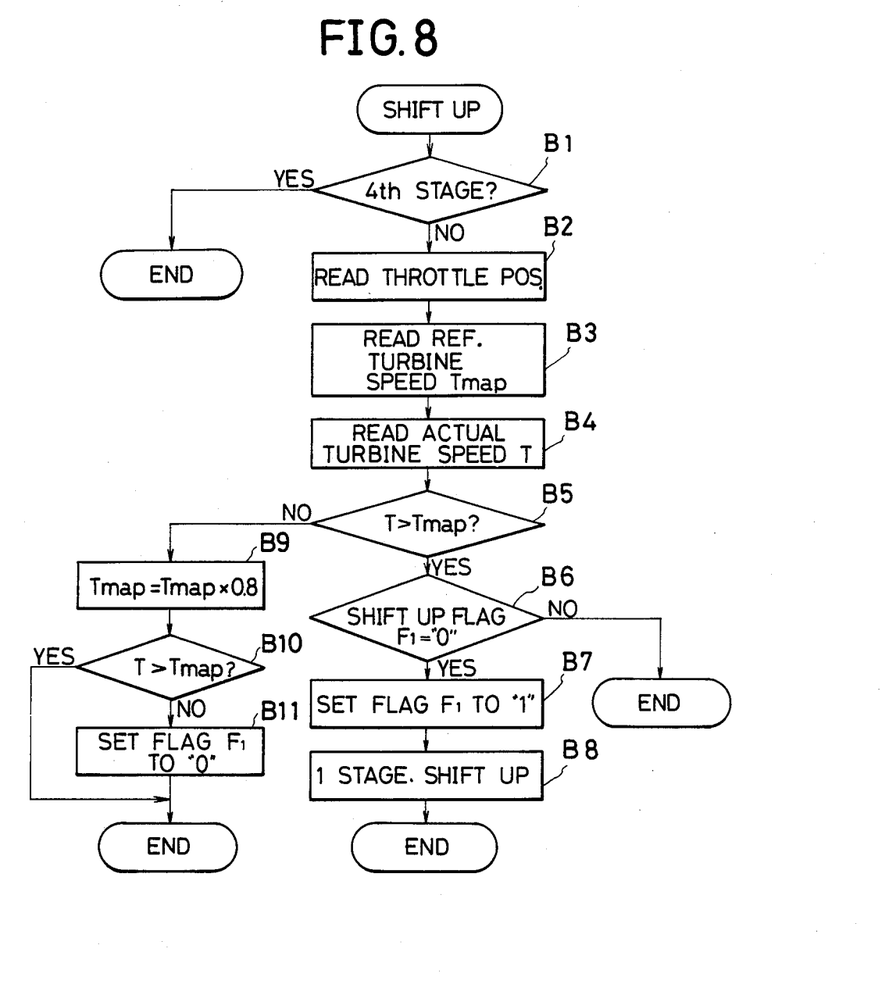
FIG. 8 is a flow chart showing the steps of shift-up control.
Figure 9:
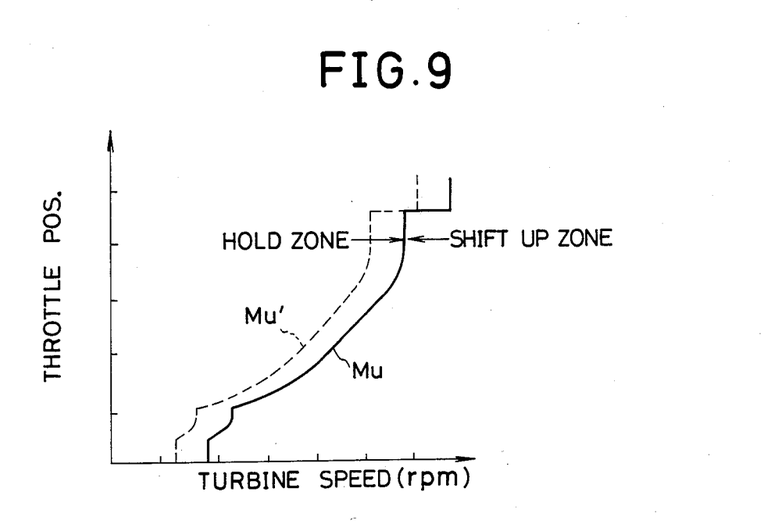
FIG. 9 is a diagram showing the shift-up map.

Referring to FIG. 8, the gear position of the transmission gear mechanism 20 is at first read and judgement is made in the step $B_1$ as to whether the gear mechanism 20 is at the fourth stage. If the judgement is YES, the shift-up control is terminated because no further shift-up is possible. If the fourth gear stage judgement in the step $B_1$ is NO, the engine throttle valve position is read in the step $B_2$ and a reference turbine speed Tmap is read in the step $B_3$ from the selected shift-up control line MU which is shown in FIG. 9. Thereafter, the actual turbine speed T is read in the step $B_4$ and a judgement is made in the step $B_5$ as to whether the actual turbine speed T is greater than the reference turbine speed Tmap. If the judgement is YES, a further judgement is made in the step $B_6$ as to whether the shift-up flag $F_1$ is set to zero. If the result of the judgement is NO, the procedure is terminated but, if the judgement is YES, the shift-up flag $F_1$ is set to one in the step $B_1$ and one stage shift up is carried out in the step $B_8$ by appropriately energizing the solenoids 71, 72 and 73.

If the judgement in the step $B_5$ is NO, a new shift up control line Mu' is provided as shown in FIG. 9 by multiplying in the step $B_9$ the reference turbine speed Tmap with a constant 0.8 to obtain a new reference speed Tmap. Then, a judgement is made in the step $B_{10}$ as to whether the actual turbine speed T is greater than the new reference speed Tmap. If the result of the judgement is YES, the procedure is terminated but, if the judgement is NO, the shift up flag $F_1$ is reset to zero in the step $B_{11}$. The steps $B_9$ through $B_{11}$ are performed in order for preventing the gear shifting operations are repeatedly carried out when the turbine speed T is close to the reference turbine speed Tmap.

Shift Down Control

Figure 10:
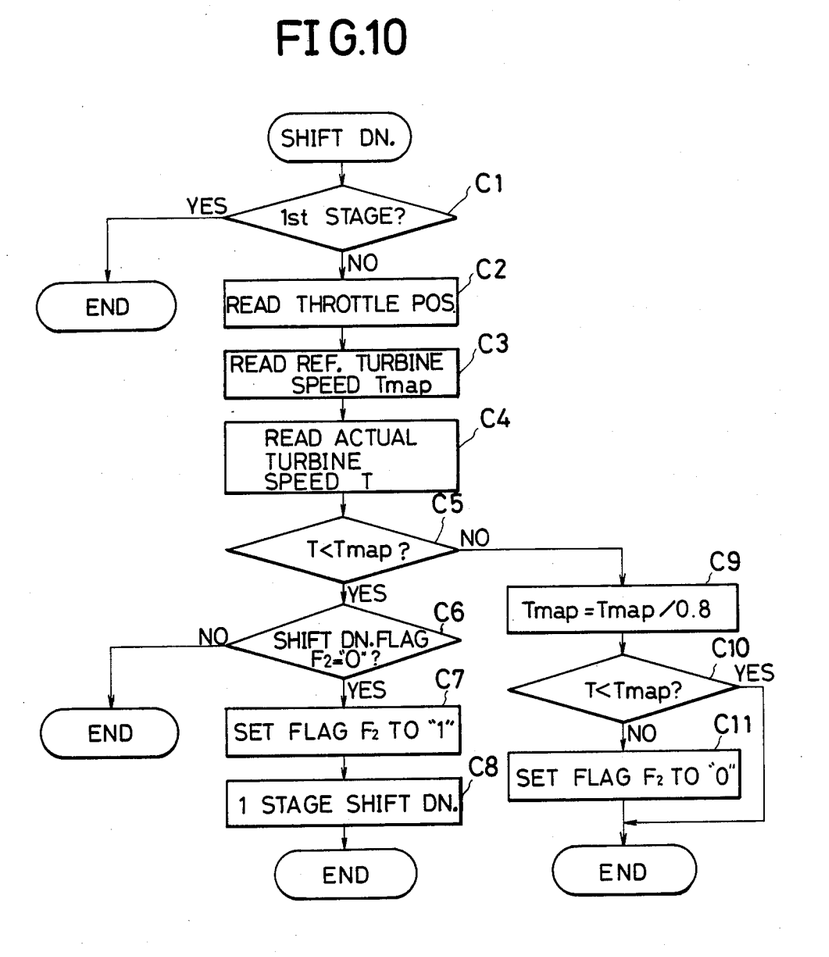
FIG. 10 is a flow chart showing the steps of shift-down control.

As shown in FIG. 10, in the gear shift down control, the gear position of the transmission gear mechanism 20 is at first read and judgement is made in the step $C_1$ as to whether the gear mechanism is at the first stage. If the judgement is YES, no further control can be carried out so that the control is finished.

Figure 11:
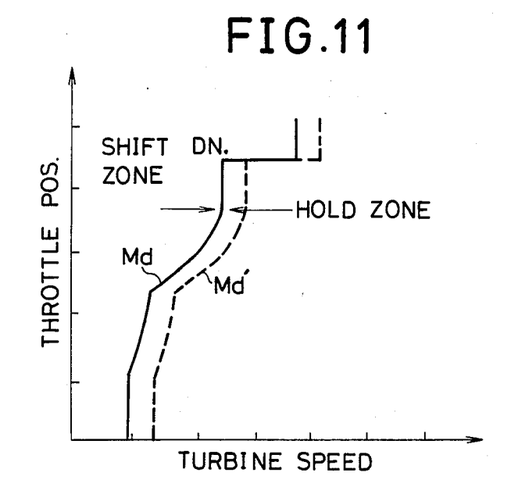
FIG. 11 is a diagram showing the shift-down map.

If the aforementioned judgement is NO, the engine throttle valve position is read in the step $C_2$ and a reference turbine speed Tmap is read in the step $C_3$ from the selected shift down control line Md which is shown in FIG. 11. Thereafter, the actual turbine speed T is read in the step $C_4$. Then, a judgement is made in the step $C_5$ as to whether the actual turbine speed T is smaller than the reference turbine speed Tmap. If the result of the judgement is YES, a further judgement is made in the step $C_6$ as to whether the shift down flag $F_2$ is in the zero position. If the result of the judgement is NO, the procedure is terminated but, if the result of the judgement is YES, the shift down flag $F_2$ is set to one in the step $C_7$ and a one-stage shift down is carried out in the step $C_8$.

If the judgement in the step $C_5$ is NO, a new shift down control line Md' is provided as shown in FIG. 11. This is in effect carried out by dividing in the step $C_9$ the reference turbine speed Tmap by a constant 0.8 to obtain a new reference turbine speed Tmap. Then, a judgement is made in the step $C_{10}$ as to whether the actual turbine speed T is smaller than the new reference speed Tmap. If the result of the judgement is YES, the procedure is terminated but, if the result of the judgement is NO, the shift down flag $F_2$ is reset to zero in the step $C_{11}$.

Lock Up Control

Figure 12:
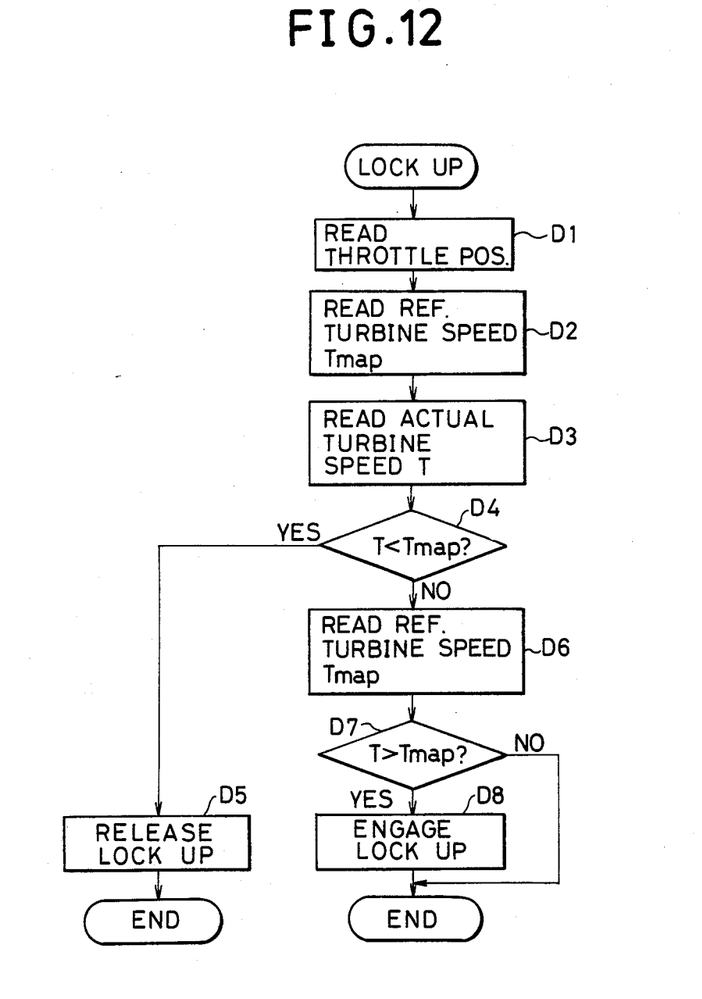
FIG. 12 is a flow chart showing the steps of converter lock-up control.
Figure 13:
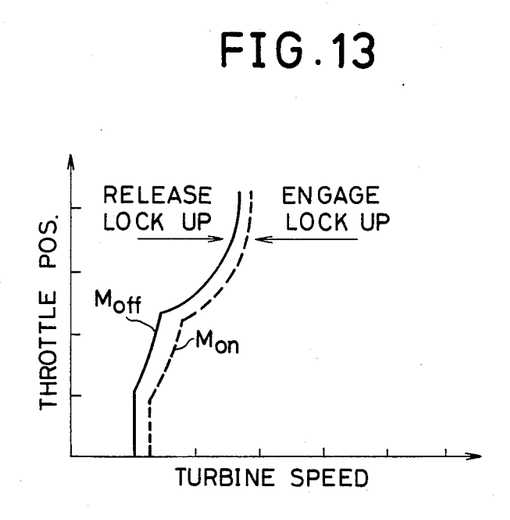
FIG. 13 is a diagram showing the lock-up map.

Referring to FIG. 12, the engine throttle valve position is read in the step $D_1$ and a reference turbine speed Tmap is read in the step $D_2$ from the lock up release line Moff as shown in FIG. 13. Then, the actual turbine speed T is read in the step $D_3$ and a judgement is made in the step $D_4$ as to whether the actual turbine speed T is smaller than the reference turbine speed Tmap. If the result of the judgement is YES, the step $D_5$ is carried out to release the lock-up clutch 17 but, if the result of the judgement is NO, a further reference turbine speed Tmap is read in the step $D_6$ from the lock up engage line Mon. Thereafter, a judgement is made in the step $D_7$ as to whether the actual turbine speed T is greater than the reference turbine speed Tmap. If the result of the judgement is NO, the procedure is finished. if the judgement is YES, a signal is produced in the step $D_8$ to engage the lock up clutch 17.

Shift Shock Moderating

Referring again to FIG. 7, if the result of the judgement in the step $A_3$ is YES, a judgement is made in the step $A_{16}$ as to whether the vehicle is stopped. If the result of the judgement is NO, the procedure goes to the step $A_4$. If, however, the answer of the judgement in the step $A_{16}$ is YES, a judgement is made in the step $A_{17}$ as to whether the converter turbine speed T is smaller than 200 rpm. If the result of the judgement is NO, the shifting up to the fourth stage is carried out in the step $A_{18}$ and the procedure returns to the step $A_{17}$. If the result of the judgement in the step $A_{17}$ is YES, a judgement is made in the step $A_{19}$ as to whether the engine is idling. If the answer is NO, the procedure goes to the step $A_4$ but, if the answer is YES, a further judgement is made in the step $A_{20}$ as to whether the brake is engaged. If the answer is NO, the procedure goes to the step $A_4$ but, if the answer is YES, the transmission gear mechanism is set to the fourth stage in the step $A_{21}$ and the procedure returns to the step $A_{19}$.

The invention has thus been shown and described with reference to a specific embodiment, however, it should be noted that the invention is in no way limited to the details of the illustrated embodiment but changes and modifications may be made without departing from the scope of the appended claims.

We claim:

1. A vehicle having vehicle brake means, an engine provided with engine output control means having an idle position, an automatic transmission comprising a torque converter having a turbine, a multiple-stage transmission gear mechanism connected with the turbine of the torque converter and having a neutral gear stage, a first gear stage and at least one higher gear stage, gear stage selecting means for selecting one of the gear stages, and a shift lever having a neutral range and at least one running range for operating the gear stage selecting means so that the neutral gear stage is selected when the shift lever is in the neutral range and one of the first and higher gear stages is selected when the shift lever is in the running range, the improvement comprising shift operation detecting means for detecting that the shift lever is actuated from the neutral range to the running range, turbine speed detecting means for detecting a rotating speed of the turbine in said torque converter, control means responsive to output signals from both said detecting means to operate the gear stage selecting means when the shift lever is actuated from the neutral range to the running range so that the gear mechanism is shifted from the neutral gear stage up to the higher gear stage until the speed of the turbine in the torque converter is decreased to a predetermined value.

2. A vehicle in accordance with claim 1 which further includes vehicle stop detecting means for detecting that the vehicle is stopped, said control means being operative only when the vehicle stop detecting means detects that the is stopped.

3. A vehicle in accordance with claim 1 in which said transmission gear mechanism has at least three gear stages including first gear stage, a medium gear stage and a top gear stage, said higher gear stage being said top gear stage.

4. A vehicle in accordance with claim 1 in which said control means includes shift signal producing means for producing a shift signal in accordance with a vehicle speed signal and an engine load signal, said control means further including means for passing the shift signal to the gear stage selecting means when the speed of the turbine is decreased to the predetermined value.

5. A vehicle in accordance with claim 1 which further includes engine idle detecting means for detecting that the engine output control means is in the idle position and brake detecting means for detecting that vehicle brake means is engaged, the control means being responsive to output signals from the idle detecting means and the brake detecting means for operating the gear stage selecting means so that the gear mechanism is maintained in the higher gear stage even after the speed of the turbine has decreased to the predetermined value when the engine output control means in the idle position and the vehicle brake means is engaged.

6. A vehicle in accordance with claim 1, which further includes vehicle stop detecting means for detecting that the vehicle is stopped, engine idle detectinq means for detecting that the engine output control means is in the idle position, brake detecting means for detecting that the vehicle brake means is actuated, said control means being responsive to signals from the vehicle stop detecting means, the engine idle detectinq means and the brake detecting means to operate the gear staqe seleoting means so that the higher gear stage is maintained even after the speed of the turbine in the torque converter is decreased below the predetermined value when the vehicle stop detecting means detects that the vehicle is stopped, the enqine idle detecting means detects that the engine output control means is in the idle position and the brake detecting means detects that the vehicle brake means is actuated.

7. A vehicle in accordance with claim 1 in which said gear stage selecting means includes hydraulic actuator means and electromagnetic means for controlling supply of working fluid to the hydraulic actuator means, said shift operation detecting means and the turbine speed detecting means respectively having means for producing electric signals, said control means being means receiving the electric signals and producing outputs to be applied to the electromagnetic means.

* * * * *